(12) United States Patent
Kim et al.

(10) Patent No.: US 7,735,128 B2
(45) Date of Patent: Jun. 8, 2010

(54) METHOD OF STORING PATTERN MATCHING POLICY AND METHOD OF CONTROLLING ALERT MESSAGE

(75) Inventors: Byoung Koo Kim, Daejeon (KR); Kwang Ho Baik, Daejeon (KR); Jin Tae Oh, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 852 days.

(21) Appl. No.: 11/635,245

(22) Filed: Dec. 7, 2006

(65) Prior Publication Data
US 2007/0147382 A1    Jun. 28, 2007

(30) Foreign Application Priority Data
Dec. 9, 2005    (KR) ...................... 10-2005-0120990

(51) Int. Cl.
*G06F 9/00*    (2006.01)
*G06F 7/04*    (2006.01)
*H04L 9/00*    (2006.01)

(52) U.S. Cl. .............................. 726/13; 726/23; 726/14; 726/15; 713/153; 713/154; 713/155

(58) Field of Classification Search .................... 726/13
See application file for complete search history.

(56) References Cited

FOREIGN PATENT DOCUMENTS

| | | |
|---|---|---|
| KR | 1020030049078 | 6/2003 |
| KR | 1020040069315 | 8/2004 |
| WO | WO03/052631 | 6/2003 |

OTHER PUBLICATIONS

"Towards Faster String Matching for Intrusion Detection or Exceeding the Speed of Snort." C. Jason Coit et al. © 2001 IEEE. pp. 367-373.
"Specialized Hardware for Deep Network Packet Filtering." Young H. Cho et al. © Springer-Verlag Berlin Heidelberg 2002. pp. 452-461.

*Primary Examiner*—Longbit Chai
(74) *Attorney, Agent, or Firm*—Ladas & Parry LLP (57) ABSTRACT

A method of storing a pattern matching policy and a method of controlling an alert message are provided. The method includes (a) generating a content structure as a sub-structure of a header combination structure of a stored traffic pattern which is a policy to be newly applied to a pattern matching apparatus; (b) determining whether a content of the stored traffic pattern is identical to a content of an original traffic pattern stored in advance in the pattern matching apparatus; (c) allocating a content index of the content of the original traffic pattern to the content of the stored traffic pattern if the content of the stored traffic pattern is identical to the content of the original traffic pattern; and (d) determining whether a header combination structure of the original traffic pattern comprises only one content structure or more than one content structure and allocating a header index of the header combination structure of the stored traffic pattern to the header combination structure of the original traffic pattern if the header combination structure of the original traffic pattern is found to comprise only one content structure. Accordingly, it is possible to efficiently use hardware memories with limited storage capacities and effectively perform a pattern matching function.

6 Claims, 10 Drawing Sheets

METHOD OF STORING PATTERN MATCHING POLICY AND METHOD OF CONTROLLING ALERT MESSAGE

CROSS-REFERENCE TO RELATED PATENT APPLICATION

This application claims the benefit of Korean Patent Application No. 10-2005-0120990, filed on Dec. 9, 2005, in the Korean Intellectual Property Office, the disclosure of which is incorporated herein in its entirety by reference.

BACKGROUND OF THE INVENTION

1. Field of the Invention

The present invention relates to a method of using memories in a hardware pattern matching apparatus, and more particularly, to a method of storing a string value pattern matching policy and a method of controlling an alert message which can provide a considerable number of traffic patterns to hardware memories with limited storage capacities.

2. Description of the Related Art

As high-speed network infrastructure becomes widespread, the scale of damage to networks caused by malicious attacks has increasingly widened, leading to tremendous loss of time and economic resources. Now that a high-speed network environment such as a gigabit Ethernet environment has become reality, the demand for security analysis techniques capable of processing large amounts of data has grown steadily. In order to meet this demand, various efforts have been made to implement high-speed pattern matching techniques in hardware devices. However, existing pattern matching-based hardware security systems can apply only a limited number of traffic patterns to pattern matching due to their limited storage capacities.

In the meantime, a variety of security systems focusing on network attacks have been developed. With the advent of high-speed networks and an ever-increasing number of transmissions of large amounts of data over networks, the demand for improving conventional low-speed security analysis techniques has increased. In other words, in order to effectively respond to today's network environment which constantly changes in terms of speed and the amount of data transmitted over networks and which suffers a variety of network attacks, security analysis techniques capable of analyzing a considerable amount of data within a short period of time are needed. Improved security systems adopting such security analysis techniques must also be developed.

The performance of conventional security systems is generally low in terms of packet loss rate and attack detection rate. In order to address this problem, high-speed hardware pattern matching techniques which can provide a high-speed attack detection function, a firewall function, and a virus detection function have been developed. Most of the existing security systems, based on high-speed hardware pattern matching techniques, perform a rule-based pattern inspection and require a mechanism that makes it easy to instantly add or remove traffic patterns as required.

Also, the existing security systems, based on high-speed hardware pattern matching techniques, need methods of preventing the performance of the security systems from being adversely affected by the number of traffic patterns applied to pattern matching and the length of strings of traffic patterns. However, many thousands of attack detection rules are currently available wherein the length of strings considerably varies from one attack detection rule to another. For example, the length of strings of attack detection rules range from a minimum of 1 byte to a maximum of over 100 bytes. Therefore, it is difficult to apply a considerable number of attack detection rules to pattern matching without deteriorating the performance of security systems.

For example, attack detection rules are comprised of a header combination and a string, and strings generally occupy a larger memory space than header combinations. Attack detection rules, which have the same string and different header combinations, are highly likely to be classified as being different and are thus allocated to different memory zones.

Hardware security systems, unlike software security systems, have limited memory capacities. Therefore, hardware security systems are required to efficiently apply a considerable number of traffic patterns with their limited memory capacities. In order to address the problem of security with limited memory capacities, hardware security systems can use external memories, in which case, however, deterioration of the performance of hardware security systems is inevitable. Therefore, it is necessary to develop a method of efficiently arranging a considerable number of traffic patterns in a memory with a limited storage capacity.

SUMMARY OF THE INVENTION

The present invention provides methods of managing a pattern matching policy and controlling an alert message in a pattern matching apparatus by which a considerable number of attack patterns can be efficiently loaded into hardware memories with limited storage capacities. The invention can address the problem of memory limitations imposed on existing high-performance hardware pattern matching engines needed for a high-speed network environment (e.g., a gigabit Ethernet environment) and provide a mechanism that enables identical string patterns to use the same memory spaces.

According to an aspect of the present invention, there is provided a method of storing a policy in a pattern matching apparatus. The method includes (a) generating a content structure as a sub-structure of a header combination structure of a stored traffic pattern which is a policy to be newly applied to a pattern matching apparatus; (b) determining whether a content of the stored traffic pattern is identical to a content of an original traffic pattern stored in advance in the pattern matching apparatus; (c) allocating a content index of the content of the original traffic pattern to the content of the stored traffic pattern if the content of the stored traffic pattern is identical to the content of the original traffic pattern; and (d) determining whether a header combination structure of the original traffic pattern comprises only one content structure or more than one content structure and allocating a header index of the header combination structure of the stored traffic pattern to the header combination structure of the original traffic pattern if the header combination structure of the original traffic pattern is found to comprise only one content structure.

According to another aspect of the present invention, there is provided a method of generating and controlling an alert message according to a policy stored in a pattern matching apparatus. The method includes (a) receiving a content index corresponding to a traffic pattern stored in the pattern matching apparatus; (b) determining through comparison whether the received content index is identical to a content index previously stored in the pattern matching apparatus; (c) if the received content index is identical to the previously stored content index, generating a header combination structure under the previously stored content index and generating a first alert message that matches the header combination structure; and (d) if the received content index is not identical to the previously stored content index, generating a new header combination structure and generating a second alert message that matches the new header combination structure.

According to another aspect of the present invention, there is provided a method of generating and controlling an alert message according to a policy stored in a pattern matching apparatus. The method includes (a) receiving packet data and a content index from a hardware engine; (b) determining whether a header combination structure is connected to the received content index; (c) if it is determined in (b) that a header combination structure is connected to the received content index, matching the received packet data information to a content of the header combination structure and generating a first alert message based on an alert message connected to the header combination structure; and (d) if it is determined in (b) that no header combination structure is connected to the received content index, generating a second alert message based on an alert message connected to the received content index.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
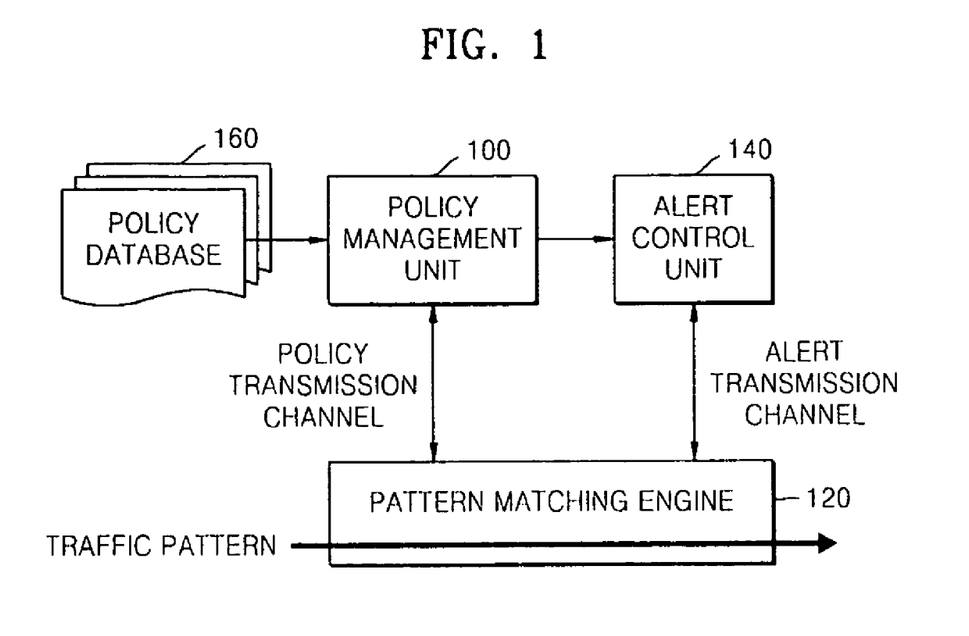
FIG. 1 is a block diagram of a high-speed hardware pattern matching apparatus according to an exemplary embodiment of the present invention.

FIG. 1 is a block diagram of a high-speed hardware pattern matching apparatus according to an exemplary embodiment of the present invention. Specifically, FIG. 1 illustrates the relationship between hardware and software portions of the high-speed hardware pattern matching apparatus.

Referring to FIG. 1, the high-speed hardware pattern matching apparatus includes a policy management unit 100, a pattern matching engine 120, an alert control unit 140, and a policy database 160.

The policy management unit 100 receives traffic patterns from the policy database 160 and manages the traffic patterns.

The pattern matching engine 120 performs a high-performance hardware pattern matching process based on traffic patterns received from the policy management unit 100.

The alert control unit 140 receives alert data from the pattern matching engine 120 and generates an alert message based on the alert data.

Here, the pattern matching engine 120 uses a sequential combination-based packet header lookup method and a pattern searching method using the identifiers of string patterns. These methods are disclosed in Korean Patent Application No. 10-2004-0087047 entitled "Apparatus for Performing Packet Header Lookup Based on Sequential Lookup and Method of the Same," and Korean Patent Application No. 10-2003-0087885 entitled "Method of Storing and Matching Patterns at High Speed."

Figure 2A:
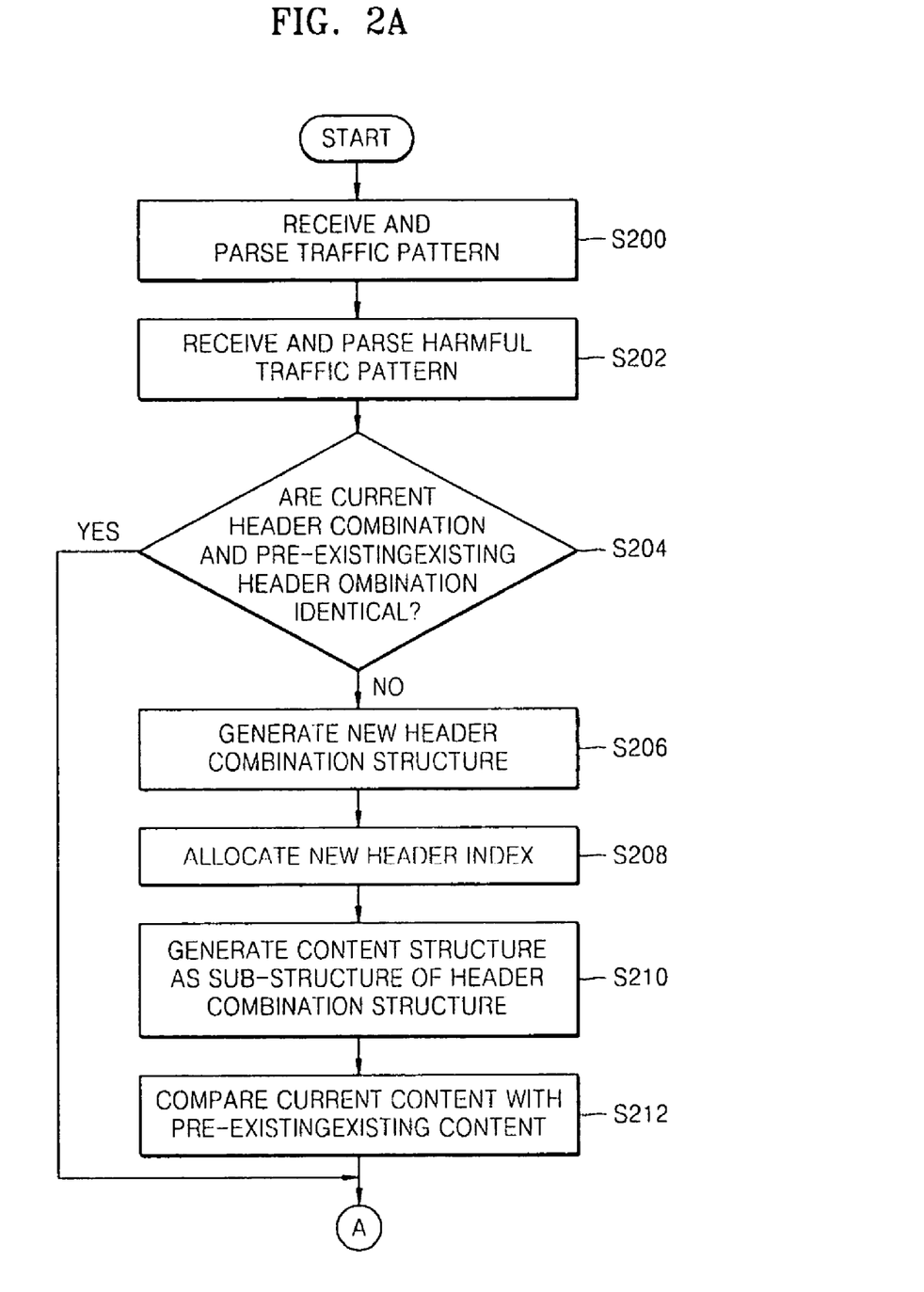
FIGS. 2A-2B are a flowchart of a method of converting traffic patterns into hardware addresses and transmitting the hardware addresses to an alert control unit of a pattern matching apparatus according to an exemplary embodiment of the present invention.
Figure 2B:
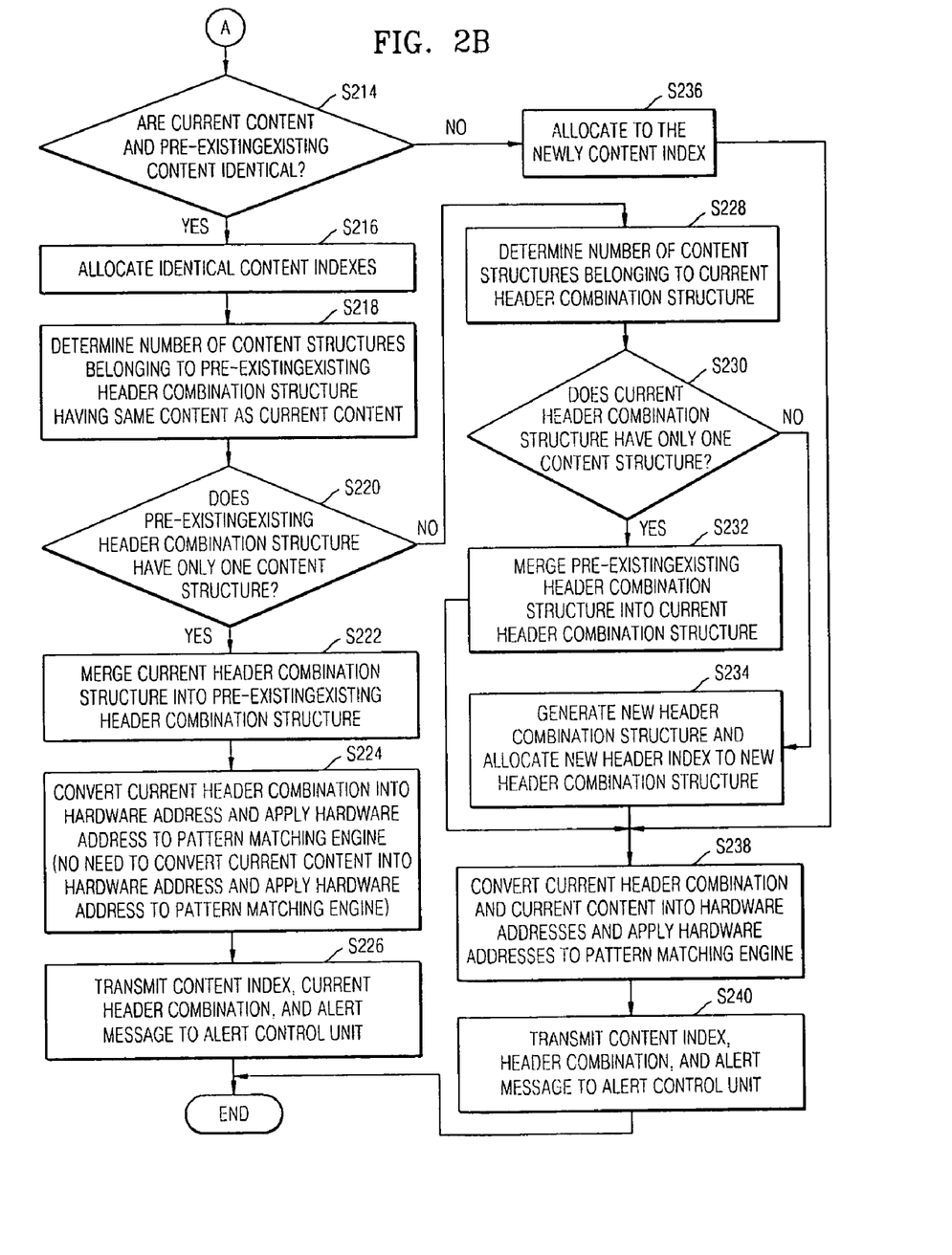

FIG. 2 is a flowchart illustrating a method of converting traffic patterns into hardware addresses and transmitting the hardware addresses to the alert control unit 140 of the pattern matching apparatus according to an exemplary embodiment of the present invention. Referring to FIG. 2, in operation S200, a traffic pattern stored in the policy database 160 is received.

In operation S202, a header combination (hereinafter referred to as the current header combination) of the received traffic pattern is compared with header combinations of original traffic patterns stored in advance in the high-speed hardware pattern matching apparatus.

In general, a traffic pattern in a network is comprised of a header combination and a string pattern. Therefore, a pattern matching operation is performed on traffic patterns by comparing both header combinations and string patterns of the traffic patterns. Here, a header combination is a combination of traffic pattern segments related to header information.

In operation S204, it is determined whether a match for the current header combination exists among the header combinations of the original traffic patterns. If none of the header combinations of the original traffic patterns match the current header combination, the method proceeds to operation S206. In operation S206, a header combination structure is newly generated for the current header combination. Thereafter, in operation S208, a header index is allocated to the newly generated header combination structure. Here, a header combination is a combination of a number of header values of a packet, and a header combination structure is a structure where one or more header combinations are stored. For example, a header combination structure of an attack pattern using TCP and containing a content "AAA" includes a TCP header combination. The content "AAA" does not belong to a header field but belongs to a payload field of a packet, the content "AAA" belongs to a content structure.

For example, when information regarding a header combination 'a' is stored in a header combination structure 'A', an identifier of the header combination structure is needed to refer to the information regarding the header combination 'a'.

In other words, a header index is an identifier of a header combination structure and also constitutes part of the header combination structure.

If it is determined in operation S204 that a match for the current header combination exists among the header combinations of the original traffic patterns, the method proceeds to operation S210.

In operation S210, a content structure (i.e., a string pattern structure) is newly generated as a sub-structure of a header combination structure of the original traffic pattern which is found to have the same header combination as the current header combination. A content structure is a structure where information regarding string patterns is stored.

An attack pattern can be divided into a header combination structure and a content structure. For example, an attack pattern using Transmission Control Protocol (TCP) and containing a content "AAA" comprises a TCP header combination structure and a content structure containing the content "AAA". A content structure is dependent on a header combination structure. Therefore, an attack pattern using TCP and containing a content "BBB" comprises a TCP header combination structure, wherein the TCP header combination structure comprises a content structure containing the content "BBB".

In operation S212, a content (hereinafter referred to as the current content) of the received traffic pattern is compared with contents of the original traffic patterns.

In operation S214, it is determined whether a match for the current content exists among the contents of the original traffic patterns. If it is determined in operation S214 that none of the contents of the original traffic patterns match the current content, the method proceeds to operation S236. In operation S236, a content index is allocated to the newly generated content structure.

In operation S238, the current header combination and the current content are converted into hardware addresses, and the hardware addresses are applied to the pattern matching engine 120. In operation S240, a header combination and a current content index of a traffic pattern, applied to the pattern matching engine 120, and an alert message for the traffic pattern are transmitted to the alert control unit 140.

In operation S216, if it is determined in operation S214 that a match for the current content exists among the contents of the original traffic patterns, a content index allocated to the header combination structure (hereinafter referred to as the existing header combination structure) of the original traffic pattern which is found to have the same content as the current content is allocated to the newly generated content structure.

In operation S218, it is determined how many content structures belong to the existing header combination structure.

In operation S220, it is determined whether the existing header combination structure includes only one content structure. In operation S222, if it is determined in operation S220 that the existing header combination structure includes only one content structure, the current header combination structure is merged into the existing header combination structure. Thereafter, in operation S224, the current header combination is converted into a hardware address, after which the hardware address is applied to the pattern matching engine 120. Thereafter, in operation S226, information regarding a policy applied to the pattern matching engine 120 is transmitted to the alert control unit 214. In operation S224, processes of converting the current content into a hardware address and applying the hardware address to the pattern matching engine 120 are unnecessary.

In operation S228, if it is determined in operation S220 that the existing header combination structure includes more than one content structure, it is determined how many content structures belong to the header combination structure of the received traffic pattern. In operation S230, it is determined whether the header combination structure of the received traffic pattern includes only one content structure.

In operation S232, if it is determined in operation S230 that the header combination structure of the received traffic pattern includes only one content structure, the existing header combination structure is merged into the header combination structure of the received traffic pattern, and the method proceeds to operation S238. In operation S238, the current header combination and the current content are converted into hardware addresses, and the hardware addresses are applied to the pattern matching engine 120. Thereafter, in operation S240, information regarding the policy applied to the pattern matching engine 120 is transmitted to the alert control unit 214.

If it is determined in operation S230 that the header combination structure of the received traffic pattern includes more than one content structure, the method proceeds to operation S234. In operation S234, the existing header combination structure and the header combination structure of the received traffic pattern are merged into a single traffic pattern, and a header index is allocated to the single traffic pattern. Thereafter, in operation S238, the current header combination and the current content are converted into hardware addresses, and the hardware addressees are applied to the pattern matching engine 120. Thereafter, in operation S240, information regarding the policy applied to the pattern matching engine 120 is transmitted to the alert control unit 214.

FIGS. 3A through 5C are diagrams illustrating examples of a method of storing a policy regarding traffic patterns according to an exemplary embodiment of the present invention.

Figure 3A:
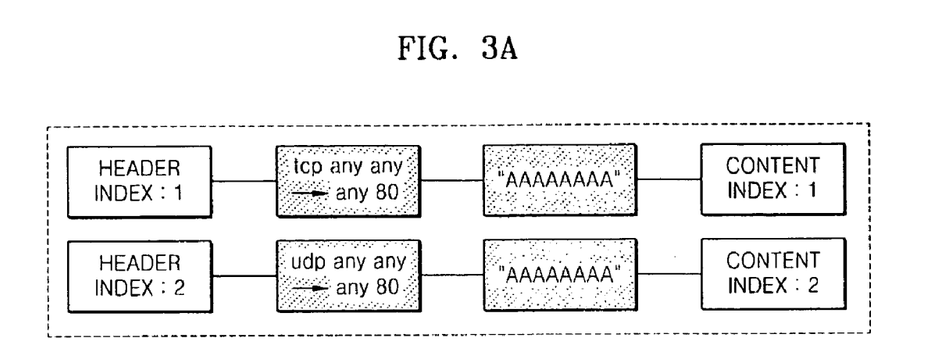
FIGS. 3A-3C are diagrams showing examples of a method of storing a pattern matching policy regarding traffic patterns according to an exemplary embodiment of the present invention.
Figure 3B:
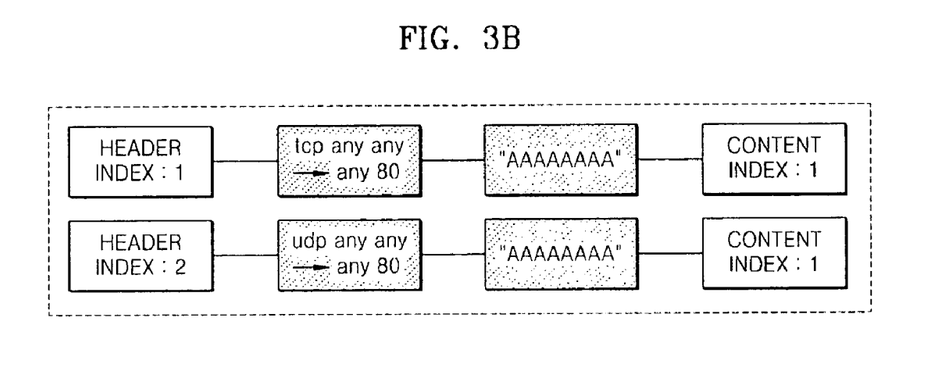
Figure 3C:
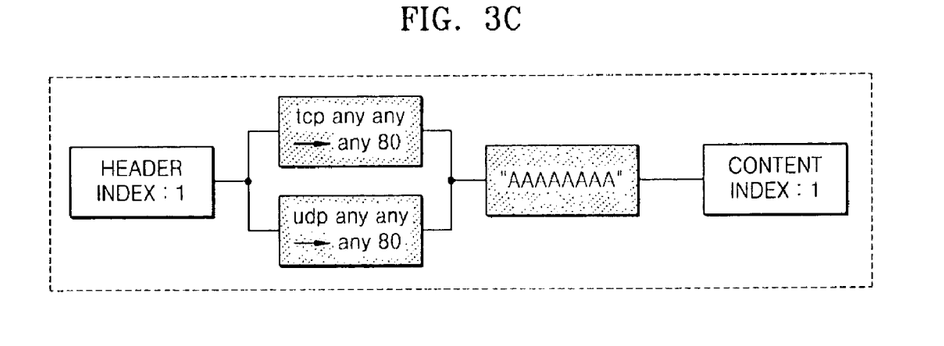

FIGS. 3A through 3C are diagrams illustrating a method of storing a policy regarding a stored traffic pattern which has a different header combination from an original traffic pattern but has the same content as a content of the original traffic pattern when a header combination structure of the original traffic pattern includes only one content structure, according to an exemplary embodiment of the present invention.

Referring to FIG. 3A, a stored traffic pattern has a header combination "udp any any→any 80" (i.e. a UDP packet sourced from any IP address and any port destined to any IP address with port 80), and an original traffic pattern has a header combination "tcp any any→any 80" (i.e. a TCP packet sourced from any IP address and any port destined to any IP address with port 80). The stored traffic pattern and the original traffic pattern both have a content "AAAAAAAA". A header combination structure of the original traffic pattern comprises only one content structure, i.e., a first content structure having a content index of 1, and a header combination structure of the stored traffic pattern also comprises only one content structure, i.e., a second content structure having a content index of 2.

Referring to FIG. 3B, the stored traffic pattern has a header index of 2, and the original traffic pattern has a header index of 1. Since the stored traffic pattern and the original traffic pattern have the same content, the content index of the second content structure is replaced with the content index of the first content structure. As a result, the first and second content structures have the same content index, i.e., a content index of 1, even though the stored traffic pattern and the original traffic pattern have different header indexes. Thereafter, since the stored traffic pattern and the original traffic pattern have the same content and the same content index, the header combination structure of the stored traffic pattern is merged into the header combination structure of the original traffic pattern, thereby obtaining a traffic pattern illustrated in FIG. 3C having a header index of 1.

Referring to FIG. 3C, the traffic pattern obtained by merging the header combination structure of the stored traffic pattern into the header combination structure of the original traffic pattern has the same header index as the original traffic pattern.

Referring to FIGS. 3A through 3C, the format of the header combination structure of the original traffic pattern does not change regardless of the structure of the stored traffic pattern. Therefore, there is no need to repeatedly convert a content into a hardware address.

Figure 4A:
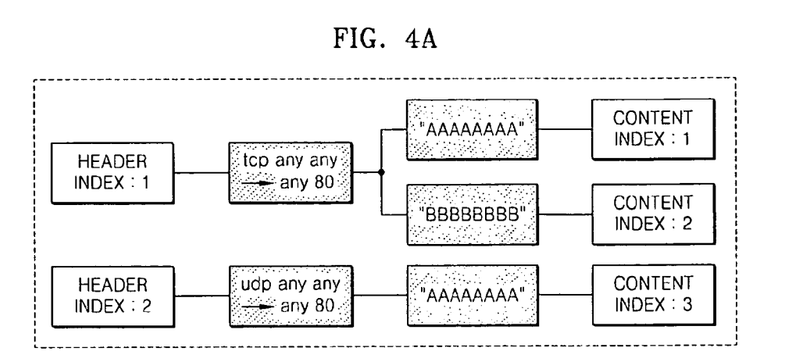
FIGS. 4A-4C are diagrams showing other examples of a method of storing a pattern matching policy regarding traffic patterns according to an exemplary embodiment of the present invention.
Figure 4B:
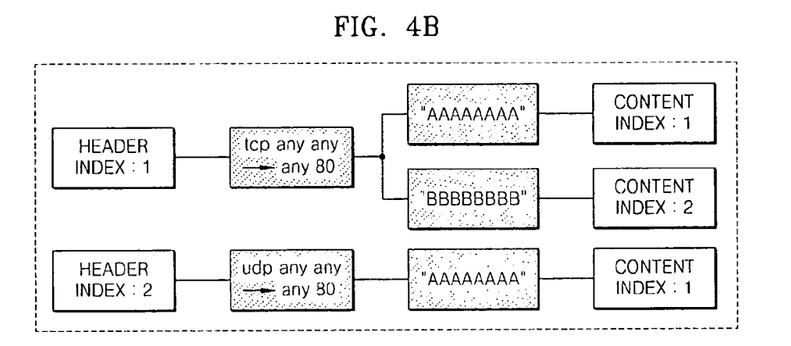
Figure 4C:
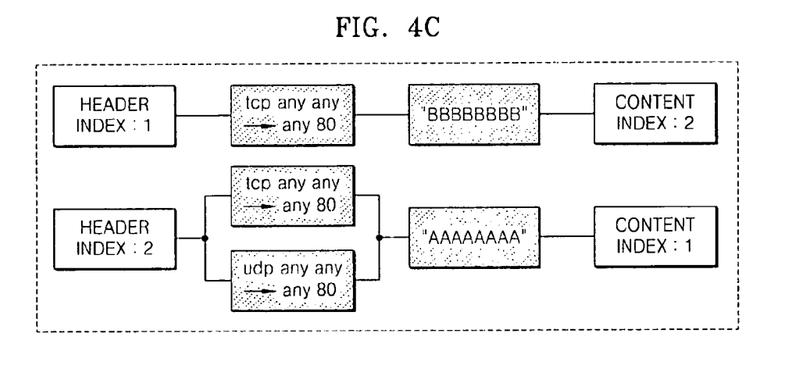

FIGS. 4A through 4C are diagrams illustrating a method of storing a policy regarding a stored traffic pattern which has a different header combination from an original traffic pattern but has the same content as a content of the original traffic pattern. The original traffic pattern contains a header combination structure which includes more than one content structure whereas the stored traffic pattern contains a header combination structure which includes only one content structure, according to an exemplary embodiment of the present invention.

Referring to FIG. 4A, a stored traffic pattern has a header combination 'udp any any→any 80', and an original traffic pattern, which is stored in advance in a pattern matching apparatus, and has a header combination 'tcp any any→any 80'. The stored traffic pattern and the original traffic pattern both have a content "AAAAAAAA". A header combination structure of the original traffic pattern includes two content structures, i.e., a first content structure having a content index of 1 and a second content structure having a content index of 2. A header combination structure of the stored traffic pattern includes only one content structure, i.e., a third content structure having a content index of 3.

Referring to FIG. 4B, the stored traffic pattern has a header index of 2, and the original traffic pattern has a header index of 1. Since the first content structure and the third content structure have the same content, the content index of the third content structure is replaced with the content index of the first content structure. As a result, the third content structure and the first content structure have the same content index, i.e., a content index of 1, even though the stored traffic pattern and the original traffic pattern have different header indexes.

Since the header combination structure of the original traffic pattern comprises more than one content structure and the header combination structure of the stored traffic pattern comprises only one content structure, a header combination structure having the first content structure can be merged into a header combination structure having the third content structure, thereby obtaining a traffic pattern illustrated in FIG. 4C having a header index of 2.

Referring to FIGS. 4A through 4C, the value of the header combination structure of the original traffic pattern is changed due to the stored traffic pattern, and thus, it is necessary to repeatedly convert a content into a hardware address.

Figure 5A:
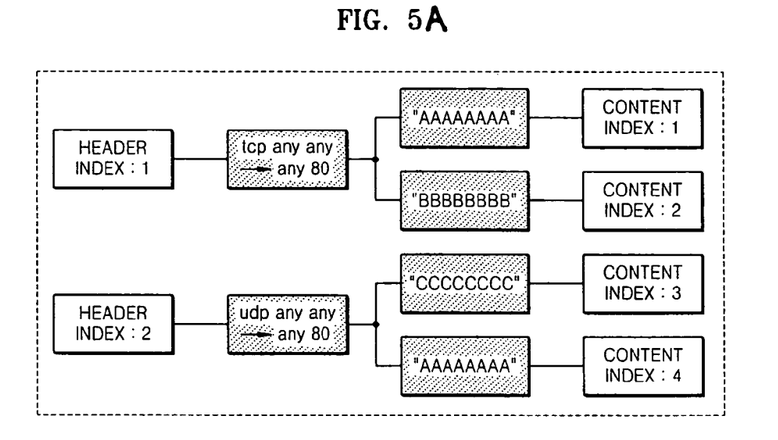
FIGS. 5A-5C are diagrams showing yet other examples of a method of storing a pattern matching policy regarding traffic patterns according to an exemplary embodiment of the present invention.
Figure 5B:
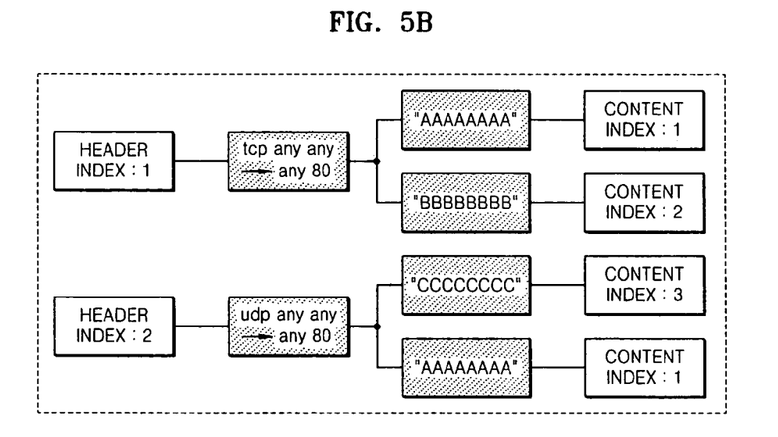
Figure 5C:
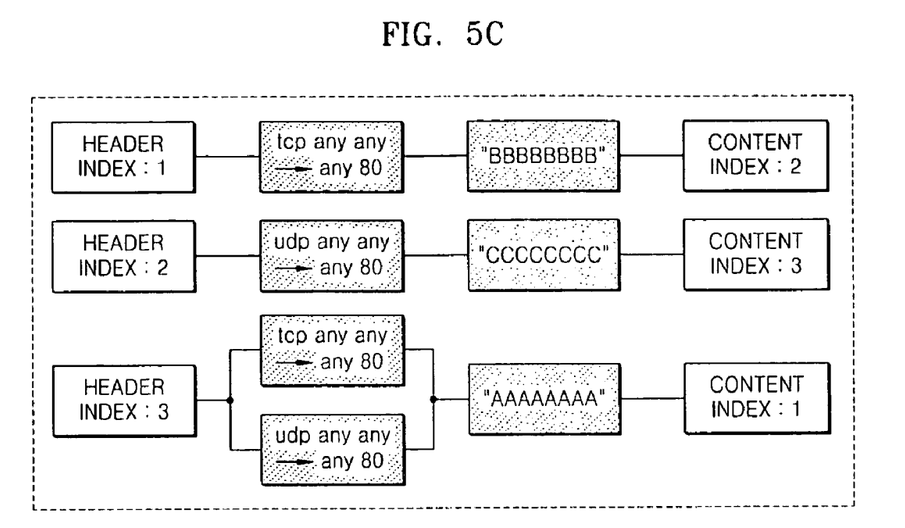

FIGS. 5A through 5C are diagrams illustrating a method of storing a policy regarding a stored traffic pattern which has a different header combination from an original traffic pattern but has the same content as the original traffic pattern. The stored traffic pattern and the original traffic pattern both contain header combination structures which comprise more than one content structure, according to an exemplary embodiment of the present invention.

Referring to FIG. 5A, a stored traffic pattern has a header combination 'udp any any→any 80', and an original traffic pattern, which is stored in advance in a pattern matching apparatus, has a header combination 'tcp any any→any 80'. The stored traffic pattern and the original traffic pattern both have a content "AAAAAAAA". A header combination structure of the original traffic pattern comprises two content structures, i.e., a first content structure having a content index of 1 and a second content structure having a content index of 2. Also a header combination structure of the stored traffic pattern comprises two content structures, i.e., a third content structure having a content index of 3 and a fourth content structure having a content index of 4.

Referring to FIG. 5B, since the first content structure and the fourth content structure have the same content, the content index of the fourth content structure is replaced with the content index of the first content structure. As a result, the first content structure and the fourth content structure have the same content index, i.e., a content index of 1. Since a header combination structure having the first content structure and a header combination structure having the fourth content structure both comprise more than one content structure, a new header index, i.e., a header index of 3, is generated and allocated to a traffic pattern. Thereafter the header combination having the first content structure and the header combination structure having the fourth content structure are integrated into the traffic pattern with the newly generated header index.

Referring to FIGS. 5A through 5C, the format of the header combination structure of the original traffic pattern is changed due to the stored traffic pattern. Therefore, it is necessary to repeatedly convert a content into a hardware address.

As described above with reference to FIGS. 3A through 5C, identical string patterns share the same memories. Thus, it is possible to efficiently manage hardware memories.

Figure 6:
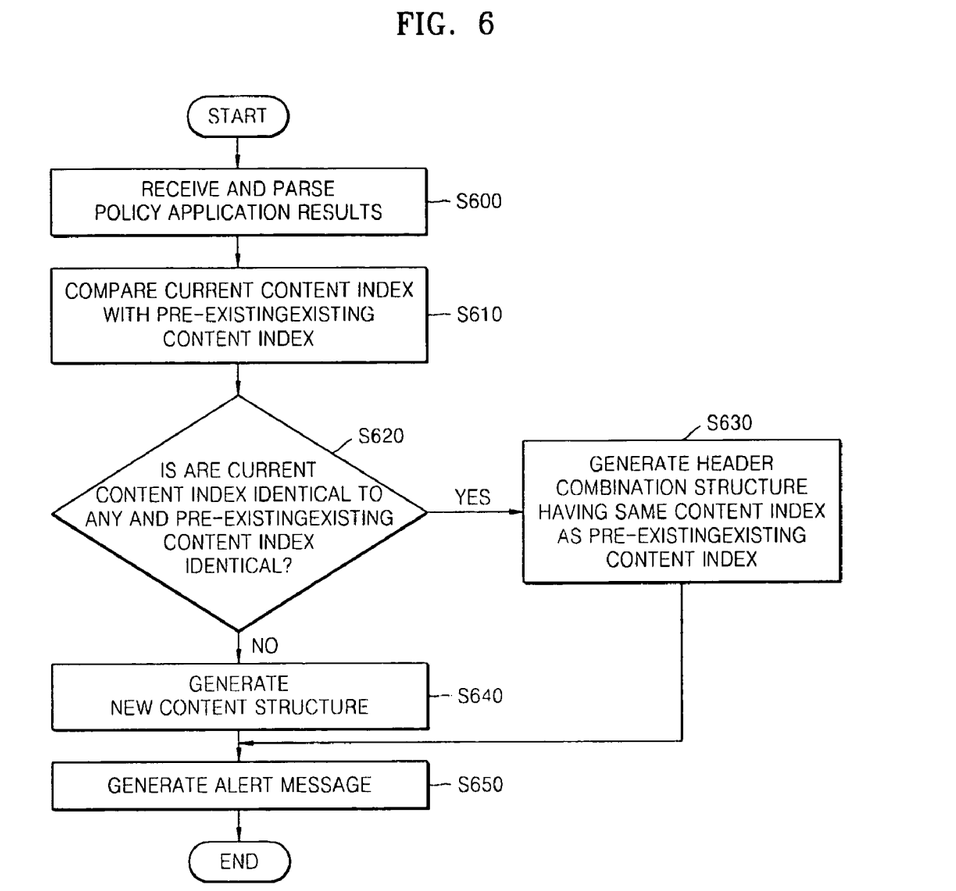
FIG. 6 is a flowchart illustrating a method of receiving and managing traffic patterns according to an exemplary embodiment of the present invention, which is performed by an alert control unit of a pattern matching apparatus according to an exemplary embodiment of the present invention.

FIG. 6 is a flowchart illustrating a method of receiving and managing traffic patterns according to an exemplary embodiment of the present invention, which is performed by the alert control unit 140 of the pattern matching apparatus illustrated in FIG. 1. The alert control unit 140 generates a precise alert message based on alert data provided by the pattern matching engine 120, which is a high-performance hardware device. Therefore, it is necessary to manage policies for executing such a precise alert message based on alert data.

Since identical contents use the same indexes, alert messages are used to identify the type of traffic present when a plurality of identical indexes are received from the pattern matching engine 120 as alert data.

Referring to FIG. 6, in operation S600, header combination information, a content index of a traffic pattern applied to the pattern matching engine 120 and an alert message for the traffic pattern are received from the policy management unit 100.

In operation S610, the received content index is compared with original content indexes stored in advance in the pattern matching apparatus.

In operation S620, it is determined whether a match for the received content index exists among the original content indexes. In operation S630, if a match for the received content index exists among the original content indexes, a new header combination structure is generated. In operation S640, if a match for the received content index does not exist among the original content indexes, a new content index is generated.

Thereafter, in operation S650, an alert message is generated.

In short, if a match for the received content index exists among the original content indexes, an alert message is generated with reference to the received header combination information. If no match is found, an alert message is generated without reference to the header combination information. The method illustrated in FIG. 6 may be repeatedly performed whenever a new policy is applied.

Figure 7A:
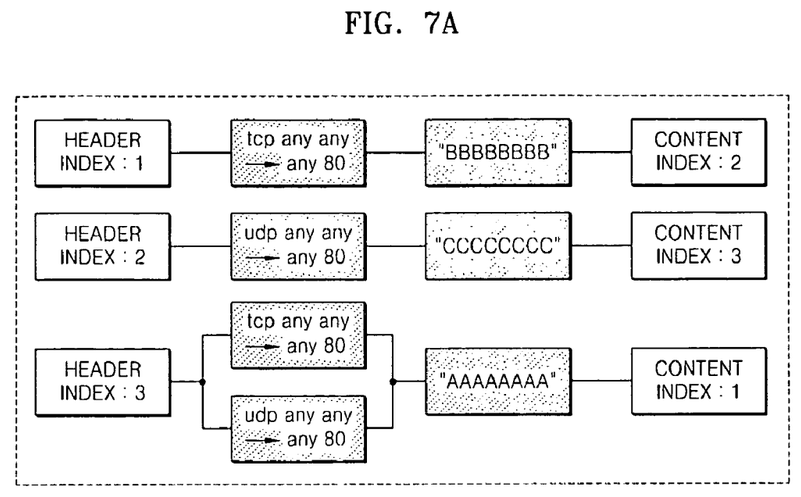
FIGS. 7A and 7B are diagrams illustrating the formats of traffic patterns managed by an alert control unit of a pattern matching apparatus according to an exemplary embodiment of the present invention using the method illustrated in FIG. 6.
Figure 7B:
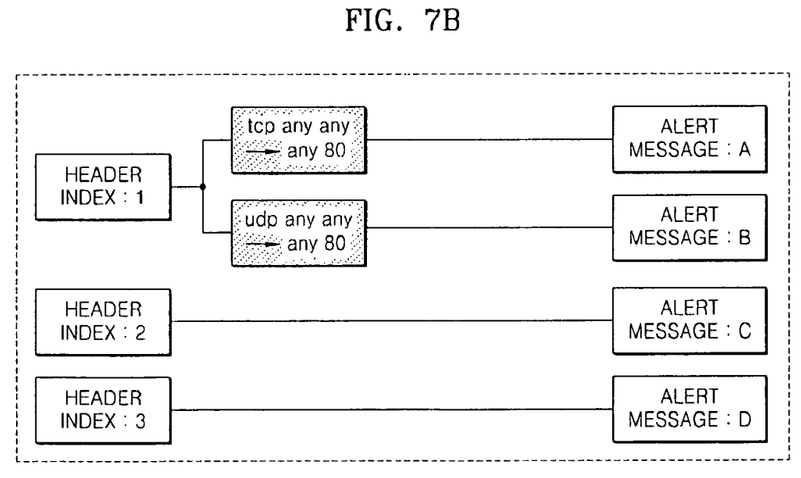

FIGS. 7A and 7B are diagrams illustrating the method illustrated in FIG. 6, i.e., how traffic patterns applied to the pattern matching engine 120 by the policy management unit 100 are managed by the alarm control unit 140, according to an exemplary embodiment of the present invention. Referring to FIG. 7A, a first traffic pattern having a content index of 2 and a second traffic pattern having a content index of 3 do not have any content in common. Therefore, as described above with reference to FIG. 6, an alert message is directly allocated to the content indexes of the first and second traffic patterns.

A third traffic pattern is a traffic pattern into which two header combination structures having the same content index, i.e., a content index of 1, are integrated. Therefore, as described above with reference to FIG. 6, an alert message is allocated to each of the two header combinations.

The alert control unit 140 converts the first, second and third traffic patterns into traffic patterns illustrated in FIG. 7B and manages the conversion results.

Figure 8:
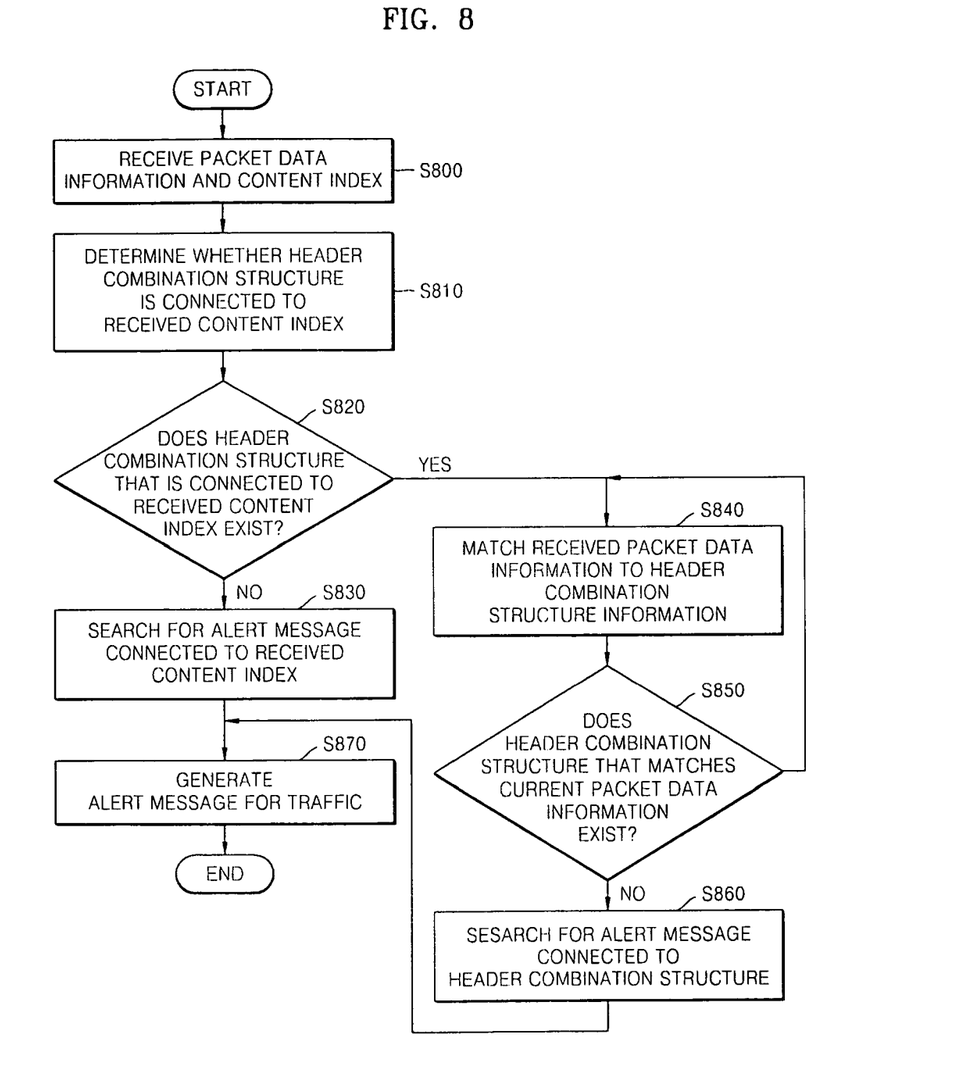
FIG. 8 is a flowchart illustrating a method of receiving alert data from a pattern matching engine and processing the alert data according to an exemplary embodiment of the present invention which is performed by an alert control unit of a pattern matching apparatus according to an exemplary embodiment of the present invention.

FIG. 8 is a flowchart illustrating a method of receiving alert data from the pattern matching engine 120 and processing the received alert data according to an exemplary embodiment of the present invention. Referring to FIG. 8, alert data generated by the pattern matching engine 120 comprises packet data information, which is determined as being pattern traffic, and a content index which is matched to the packet data information. Since identical contents have the same content index, it is necessary to obtain precise alert messages by differentiating the traffic patterns with identical contents from one another.

Referring to FIG. 8, in operation S800, packet data information and a content index are received from the pattern matching engine 120.

In operation S810, the received content index is examined to determine whether, or not, a header combination structure is connected to the received content index.

If it is determined in operation S820 that a header combination structure is connected to the received content index, the method proceeds to operation S840. In operation S840, information of the header combination structure is sequentially matched to the packet data information received.

In operation S840, it is determined whether, or not, a header combination structure that matches the current packet data exists. If it is determined in operation S850 that the header combination structure that matches the current packet data exists, in operation S860 an alert message, connected to the identified header combination structure is searched for. Thereafter, in operation S870, an alert message for traffic is generated.

On the other hand, if it is determined in operation S820 that no header combination structure matches the received content index, the method proceeds to operation S830. In operation S830, an alert message connected to the received content index is searched for. Thereafter, in operation S870, an alert message for traffic is generated.

The method illustrated in FIG. 8 is performed whenever alert data is received from the pattern matching engine 120.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, the present invention provides a string pattern-oriented policy management method and an alert control method by utilizing a high-performance hardware pattern matching function suitable for a high-speed network environment (e.g., a gigabit Ethernet environment).

In addition, according to the present invention, it is possible to apply a considerable amount of traffic patterns to hardware memories with limited storage capacities by enabling a high-performance hardware pattern matching engine to efficiently use memories.

Moreover, according to the present invention, it is possible to effectively respond to traffic in a broadband network and minimize damage to a network by efficiently and quickly detecting a variety of traffic.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of storing a policy in a pattern matching apparatus comprising:
configuring at least one processor to perform the functions of:
(a) storing an original traffic pattern in the pattern matching apparatus and generating a content structure for a specific string pattern as a substructure of a header combination structure of a subsequently stored traffic pattern which is a policy to be newly applied to the pattern matching apparatus, wherein the header combination structure with a header index is a combination structure of traffic pattern segments related to header information;
(b) determining whether a content of the subsequently stored traffic pattern is identical to a content of the original traffic pattern stored in advance in the pattern matching apparatus;
(c) allocating a content index of the content of the original traffic pattern to the content of the subsequently stored traffic pattern if the content of the subsequently stored traffic pattern is identical to the content of the original traffic pattern; and
(d) determining whether a header combination structure of the original traffic pattern comprises only one content structure or more than one content structure and allocating a header index of the header combination structure of the subsequently stored traffic pattern to the header combination structure of the original traffic pattern by replacing and merging a different header index of header combination structure of the subsequently stored traffic pattern corresponding to said newly applied policy with a same header index of header combination structure of the original traffic pattern in response to the header combination structure of the original traffic pattern containing only one content structure.

2. The method of claim 1 further comprising (e) if the header combination structure of the original traffic pattern is found in (d) to comprise more than one content structure, determining whether the header combination structure of the stored traffic pattern comprises only one content structure or more than one content structure, and allocating a header index of the header combination structure of the original traffic pattern to the header combination structure of the stored traffic pattern if the header combination structure of the stored traffic pattern is found to comprise only one content structure.

3. The method of claim 2 further comprising, after (e), converting the header combination structure and the content of the stored traffic pattern into hardware addresses.

4. The method of claim 2 further comprising (f) if the header combination structure of the stored traffic pattern is found in (e) to comprise more than one content structure, replacing the header indexes of the stored traffic pattern and the original traffic pattern with a new header index.

5. The method of claim 4 further comprising, after (f), converting the header combination structure and the content of the stored traffic pattern into hardware addresses.

6. The method of claim 1 further comprising, after (d), converting the header combination structure of the stored traffic pattern into a hardware address.

* * * * *